Inventor
George C. Meibuhr
by Hill, Sherman, Meroni, Gross & Simpson Attys

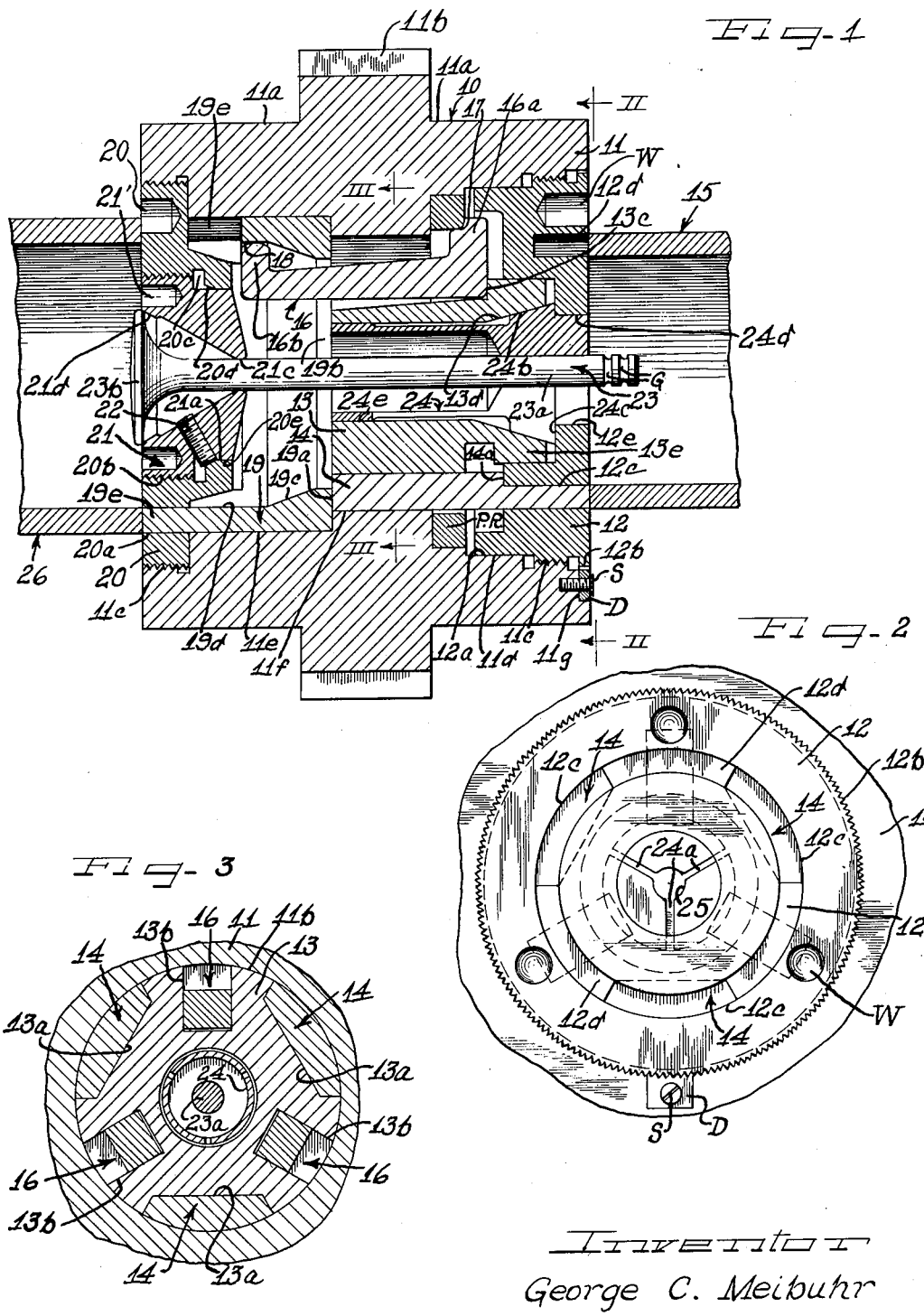

United States Patent Office 2,736,560
Patented Feb. 28, 1956

2,736,560

SPINDLE AND COLLET ASSEMBLY

George C. Meibuhr, Euclid, Ohio, assignor to Thompson Products, Inc., Cleveland, Ohio, a corporation of Ohio Application January 30, 1951, Serial No. 208,532

13 Claims. (Cl. 279—46)

This invention relates to a spindle and collet assembly characterized by its short length and being especially adapted for use on headed workpieces in such a manner that the head of the workpiece can be automatically bottomed and aligned to effect a desired projection of the other end of the workpiece from the spindle.

Specifically, this invention deals with a collet assembly having a high mechanical advantage gripping the workpiece close to the point where the working operation is to be effected thereon, adjustable to compensate for variations in workpiece diameter, adjustable for wear, having an adjustable workpiece locater, and utilizing centrifugal force for assisting release of the workpiece.

According to this invention, a spindle having bearing surfaces for rotatable mounting, and driven by a connection between the bearing surfaces, has internal bearing walls which are concentrically arranged relative to the external bearing surfaces for holding internal collet components. These components include a resiliently contractible and expansible multi-jawed collet with an inside diameter corresponding to the workpiece diameter, a collet closing sleeve piloted on an internal bearing wall of the spindle, a plurality of collet closing fingers acting on the sleeve, a cam ring operating the collet closing fingers and slidably mounted on an internal bearing surface in the spindle, a collet adjusting nut, an adjustable work locating ring, a collet finger pressure ring, and a collet adjusting nut retainer lock. In operation, the spindle is rotated on its external bearing surfaces, a headed workpiece is inserted into the spindle to seat the head on the locator and to project the shank of the workpiece through the collet and beyond the other side of the spindle. The finger cam is then actuated to lock the fingers, thereby causing the collet closing sleeve to slide over a tapered surface of the collet and contract the collet jaws around the workpiece at a point very close to the projecting portion of the workpiece on which the work is to be done.

It is, then, an object of this invention to provide a spindle and collet assembly having a very high mechanical advantage with low operating force.

Another object of the invention is to provide a spindle and collet assembly of a very short length especially suited for use on headed workpieces and equipped with a workpiece locator that will engage the head of the workpiece to permit the shank to project from the spindle a desired distance beyond the adjacent collet which grips the shank.

A still further object of the invention is to provide a collet which is opened and closed by external means and remains fixed in either position when external force is removed.

Another object of the invention is to provide a collet assembly with an adjustment for maintaining correct collet tension and for compensating against wear.

A still further object of the invention is to provide a collet and spindle assembly wherein the spindle has external cylindrical bearing surfaces for rotatably mounting the assembly and has internal bearing walls in true concentric relation to the external bearing surfaces so that internal collet parts are always concentrically disposed relative to the spindle.

Other and further objects of the invention will be apparent to those skilled in the art from the following detailed description of the annexed sheets of drawings which, by way of a preferred example only, illustrate one embodiment of the invention.

On the drawings:

Figure 1 is a longitudinal cross-sectional view, with parts in elevation, and with parts of operating sleeves at the ends thereof, showing the open position of the collet.

Figure 2 is a fragmentary end elevational view taken along the line II—II of Figure 1 with the operating sleeve omitted.

Figure 3 is a fragmentary transverse cross-sectional view taken along the line III—III of Figure 1.

As shown on the drawings:

Figure 4:
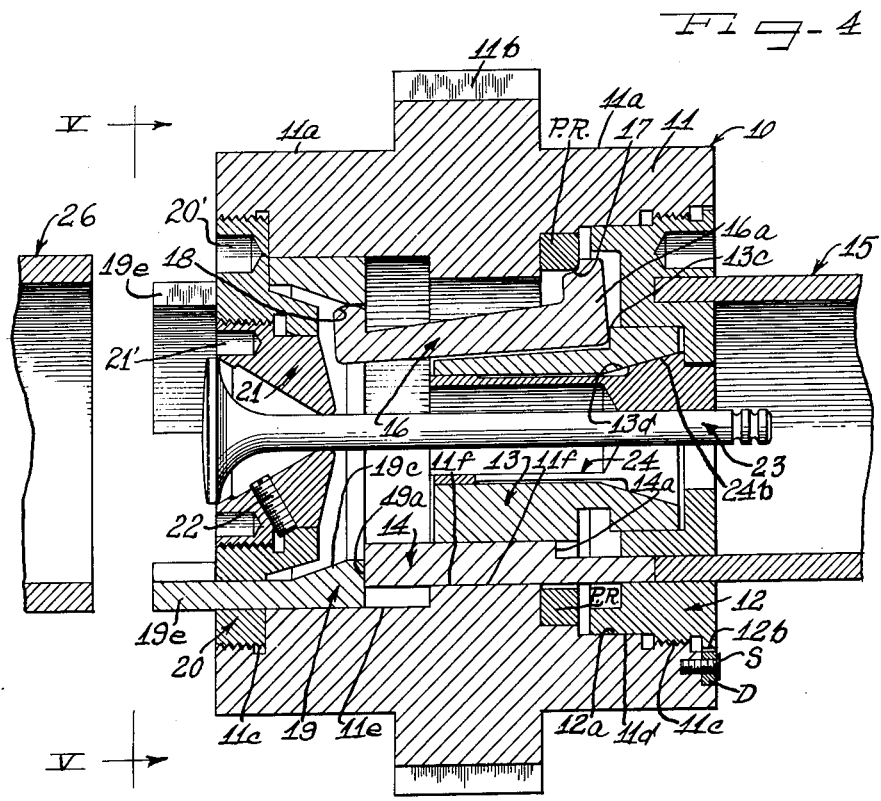
Figure 4 is a view similar to Figure 1, but illustrating the closed position of the collet.

The spindle and collet assembly 10 includes a cylindrical spindle block 11 with external cylindrical bearing surfaces 11a, 11a, on opposite sides of a central ring gear 11b. The bearing surfaces 11a, 11a are seated in a suitable bearing housing (not shown) and the ring gear 11b is engaged by suitable driving gear mechanism (not shown). Alternately, the spindle block 11 can be driven by a chain, a belt, or any suitable mechanism.

The block 11 is internally bored and ground to provide a plurality of bearing surfaces in true concentric relation with the external surfaces 11a, 11a and these internal surfaces hold the collet components. Specifically, the spindle has internally threaded bores 11c, 11c extending inwardly from the opposite end faces thereof with one of the bores 11c having an accurately ground adjacent smaller diameter smooth bore 11d and the other bore 11c having a smoothly ground smaller diameter adjacent bore 11e of longer length than the bore 11d. A smaller diameter bore 11f joins the bores 11d and 11e and shoulders are provided between the stepped bores.

An adjusting nut 12 is threaded into one end 11c and has a smooth pilot portion 12a guided on the bore wall 11d. The nut has a serrated peripheral flange 12b around its outer face and is locked in position by a complementary serrated locking dog D seated in a recess 11g in the end face of the spindle and held in the recess by a screw S threaded into the spindle. A collet finger pressure ring PR is mounted in the spindle in a bore between the bores 11d and 11f in spaced relation inwardly from the pilot portion 12a of the adjusting nut 12.

A collet closing sleeve 13 is slidably mounted on the bore 11f of the spindle 11 as best illustrated in Figure 3. The sleeve 13 has three equally spaced wide and shallow slots 13a around its periphery and alternating with three equally spaced narrower and deeper slots 13b. These slots are parallel to the axis of the sleeve. The slots 13a receive cam operating segments 14. These segments 14 are piloted on the bore 11f and extend beyond the sleeve 13 through arcuate slots 12c in the adjusting nut 12. The slots 12c alternate with blind arcuate wells 12d so that a continuous annular groove is provided in the outer face of the adjusting nut 12 for receiving a pressure ring 15 which is effective to engage the ends of the cam operating segments 14 to slide the segments toward the other end of the spindle as the ring enters the annular groove.

Each segment 14 has a shoulder 14a intermediate its ends arranged to be bottomed on the inner face of the nut 12 when the segments are moved to their outer positions as shown in Figure 1.

The slots 13b of the sleeve 13 receive collet closing fingers 16. Each finger 16 has an outturned head 16a disposed between the pressure-ring PR and the nut 12 and an outturned heel 16b disposed beyond the sleeve 13 in the bore 11e of the spindle. The head 16a is notched or recessed at 17 to receive the fulcruming surface of the ring PR. The recess is arcuate so that the finger will rock on the pressure ring.

The sleeve 13 has an annular radial shoulder 13c adapted to be engaged by the head end 16a of each finger 16 at the radial inner end of the head in substantially diagonally opposed relationship with the notched portion 17 of the head that engages the pressure ring PR. The head 16b of each finger 16 has a rounded radial outer end 18 extending into spaced relation with the bore 11e.

A cam ring 19 is slidably mounted on the bore 11e and has a radial end face 19a adapted to be bottomed on a shoulder in the spindle between the bores 11e and 11f and to project radially inward from the shoulder to be engaged by the segments 14. The cam ring 19 has a cylindrical inner wall 19b adjacent the end face 19a and extending inwardly into the ring to a diverging tapered wall 19c which slopes outwardly to a larger diameter cylindrical wall 19d. The rounded outer end of the heel 16b of each finger 16 rides on these walls 19b, 19c, and 19d as the cam ring 19 is slidably shifted on the bore wall 11e.

Figure 5:
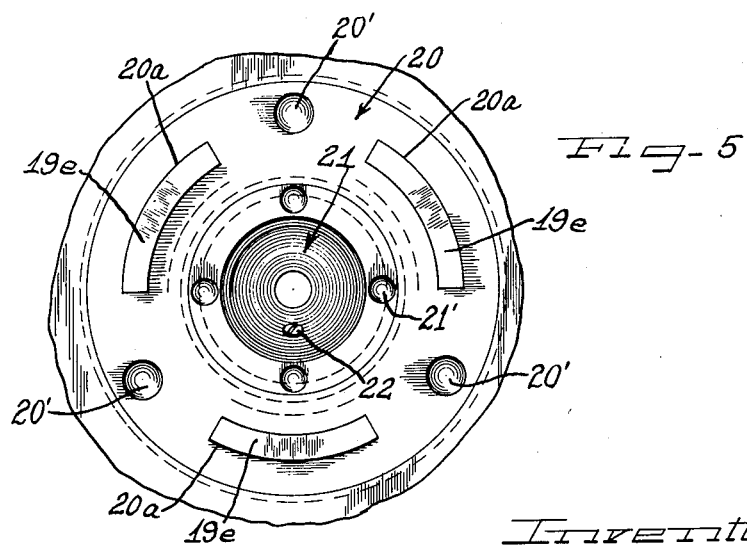
Figure 5 is an end elevational view taken along the line V—V of Figure 4.

A cam retainer nut 20 is threaded into the other portion 11c of the spindle and has three arcuate slots 20a therethrough as best shown in Figure 5. These slots 20a receive therethrough arcuate prongs 19e of the cam ring 19. The ring is thereby held against rotation and is retained in sliding engagement with the bore 11e. The nut 20 has a plurality of cylindrical wells 20' in its outer face for receiving the prongs of a wrench (not shown) so that the nut can be tightened in the spindle without any projecting head portion being exposed beyond the spindle. The nut 20 has an internally threaded bore 20b extending inwardly from its outer face to an undercut groove 20c adjacent a tapered shoulder 20d spaced from the threaded bore 20b. The shoulder 20d converges to a cylindrical bore 20e of smaller diameter than the threaded portion 20b and extending through the inner face of the nut.

A work locating ring 21 is threaded into the portion 20b of the retainer 20 and has a reduced diameter pilot portion 21a slidable in the bore 20e of the ring. Spaced wells 21' in the outer face of the locating ring 21 are adapted to receive a wrench (not shown) for threading the locating ring into the cam retaining ring.

A set screw 22 is threaded through the locating ring 21 to engage the tapered shoulder 20d and thereby determine the seated or bottomed position for the locating ring in the cam retaining ring. Thus if the set screw 22 is threaded into the work locating ring to project beyond the pilot portion 21a of the ring for predetermined distances, the projecting end will seat on the tapered shoulder 20d and the seated position of the work locating ring will be adjustably determined.

The ring 21, in the form shown, is especially shaped for receiving a poppet valve 23. The valve 23 has a stem 23a and an enlarged head 23b on one end of the stem. As shown, the work locating ring 21 has a tapered bore therethrough with a small diameter cylindrical end 21c sized to snugly embrace the poppet valve stem 23a and a larger diameter tapered end 21d sized for seating the head of the poppet valve. When properly adjusted, the locating ring 21 will permit the stem 23a to project beyond the opposite end of the spindle for exposing the portion of the stem to be worked.

The stem 23a of the poppet valve extends through a collet 24 in the sleeve 13. This collet 24 is a one-piece spring sleeve with three longitudinal slots 24a extending inwardly from the head end thereof into spaced relation from the opposite end. These slots divide the collet into three spring chucking segments.

The collet has a tapaered head 24b fitted in a tapered bore 13d in a head portion 13e of the sleeve 13. This head 13d projects beyond the bore 11f and is piloted in the adjusting nut 12. The large end of the tapered head 24b terminates at a radial shoulder 24c which is bottomed on the inner face of the adjusting nut 12. A cylindrical pilot portion 24d extends outwardly from the inner end of the shoulder 24c and springs against a cylindrical inner bore 12e of the adjustment ring 12. The opposite end of the collet 24 has an unslotted cylindrical portion 24e seated in the inner end of the sleeve 13.

The collet 24 has the chuck segments moved toward each other when the sleeve 13 is forced onto the head 24b. This decreases the diameter of the cylindrical hole 25 through the headed or slotted end of the collet for gripping the inserted valve stem 23a. Release of the collet head by the sleeve permits the collet segments to spring apart due to their inherent resiliency, thereby opening up the hole 25 and seating the pilot portions of the collet segments 24d against the bore 12e of the adjustment ring.

Shifting of the sleeve 13 to a position allowing the collet to open is effected by the pressure ring 15. Shifting of the sleeve in the opposite direction to cause the collet to close is effected by an opposed pressure ring 26 which engages the prongs 19e of the cam ring 19.

Operation

In operation, the spindle 11 is driven through the gear teeth 11b for rotating the inserted headed poppet valve 23 at a desired speed for machining the projecting stem end of the valve. As shown in Figure 1, the poppet valve 23 is inserted into the spindle from the left. Of course, it should be understood that the pressure ring 26 may be spaced from the spindle to permit insertion of the valve into the work locating ring 21. In the position of Figure 1, the cam ring 19 has been pushed into the spindle so that its end face 19a is bottomed on the shoulder of the spindle between the bores 11e and 11f. Movement of the cam ring to this position is effected by engagement of the pressure ring 26 against the prongs 19e with the prongs being flush with the retaining ring 20 when the cam ring is seated against the shoulder. In this position of the cam ring, the rounded ends 18 on the heels 16b of the fingers 16 are seated on the large diameter bore 19d of the ring and the heads 16a of the fingers are thereupon radially disposed. In this radial position of the heads 16a, the portions of the heads adjacent the sleeve shoulder 13c are swung to the left permitting the sleeve 13 to slide to the left. Centrifugal force action on the collet 24 will cause the head segments 24b of the collet to swing outwardly, thereby acting on the tapered surface 13d of the sleeve to move the sleeve to the left. In this position, the hole 25 is opened up so that the stem 23a of the poppet valve will fit freely through the hole. The poppet valve is inserted until its head 23b is bottomed on the portion 21d of the locating ring, whereupon the end of the stem will project beyond the collet a desired distance for machining grooves G or the like in the stem end. It will be noted that the portion 21c of the locating ring serves to guide the stem through the hole in the collet.

The collet is closed by backing the ring 26 off of the prongs 19e and by moving the ring 15 against the outer ends of the segments 14 in the grooves 12c. As the segments 14 are moved to the left, the ring 15 will enter the wells 12d between the slots 12c receiving the segments.

As best shown in Figure 4, the segments 14 act on the end face of the cam ring 19 to slide the cam ring to the left against the retainer 20. As the cam ring moves to the left, the prongs 19e thereof project beyond the retainer 20 and the fingers 16 are tilted, since the rounded ends 18 on the finger heels 16b will ride over the converging cam ring wall 19c. During this tilting or cocking of the fingers by the cam ring, the heads 16a of the fingers will rock about the pressure ring PR. thereupon forcing the inner ends of the heads against the shoulder 13c of the sleeve 13 and sliding the sleeve toward the right. This movement of the sleeve to the right will cause the tapered surface 13d to act on the tapered head segments 24b of the collet for contacting the hole 25 tightly against the valve stem 23a.

By proper adjustment of the nut 12, the collet segments will be at proper gripping pressure on the stem 23a just before the rounded ends 18 of the fingers 16 reach the small end of the tapered bore 19c and are about to enter the cylindrical bore 19b. Further movement of the cam to position these ends 18 in the bore 19b will thereupon slightly flex the fingers within their elastic limits to force them over the hump of the cam between the bores 19c and 19b. This flexing of the fingers prevents unwarranted opening of the collet. The flexing of the fingers also provides compensation for work diameter variations.

Rotation of the adjusting nut 12 to control the load on the work when the collet is in closed position will also effect rotation of the collet closing sleeve 13, the segments 14, and the fingers 16. This serves to change the positions of the pressure surfaces 18 of the fingers on the cam ring 19, as well as the positions of the recessed areas 17 on the pressure ring PR. The wear is thereby uniformly distributed over the entire circumference of these two members and increases the life of both parts.

The segmented head end 24d in the hole 12e of the adjusting nut 12 cannot protrude beyond the outer face of the nut irrespective of the adjusted positions of the nut in the spindle, since the shoulder 24c engages the inner face of this nut and prevents projection of the collet or chucking elements. This prevents the collet from interfering with tools in grinding or machining operations.

The collet closing sleeve, collet adjusting nut, and cam ring retainer all contribute to the concentricity of the collet so that the work is actually piloted on the inside diameter of the spindle 11. Since the outside diameter of the spindle, in turn, is accuratey mounted in bearings (not shown) it follows that extreme accurate positioning of the workpiece is maintained. The projecting end of the workpiece to be acted on during the grinding or machining operation is gripped by the collet closely adjacent the portion to be worked so that deflection possibilities are minimized. The feature of shifting a cam ring in one direction to cock fingers for shifting a collet closing sleeve in the opposite direction makes possible a very high mechanical advantage for obtaining the desired chucking pressure. The degree of chucking pressure can be varied by adjustment of the nut 12 and the exact pressure is maintained by locking the serrated face 12b of the nut with the dog D. In one embodiment of the invention, a mechanical advantage of 43 to 1 was obtained, permitting exceptionally high collet chucking pressure with low operating force.

It will be understood that modifications and variations may be effected without departing from the scope of the novel concepts of the present invention.

I claim as my invention:

1. A spindle and collet assembly comprising a cylindrical housing having a ring gear therearound intermediate the ends thereof and cylindrical bearing surfaces on opposite sides of the ring gear, said housing having a plurality of bores in stepped relation extending inwardly from opposite side faces thereof and defining a plurality of bearing walls concentric with the bearing surfaces around the outside of the housing, an adjusting nut threaded into one end of the housing and piloted on an adjacent bearing wall defined by one of the larger bores, a retainer nut threaded into the other end of the housing, a collet sleeve slidably mounted on a small diameter bore intermediate the ends of the housing and having a plurality of equally spaced longitudinal slots around the outer periphery thereof, arcuate segments slidably disposed in alternate slots of said sleeve, said adjusting nut having arcuate slots therethrough receiving the outer ends of said segments in slidable relation, fingers in the slots of said sleeve alternating with the segment carrying slots, said sleeve having a head piloted in the adjusting nut and having a cylindrical bore therethrough with a diverging tapered mouth adjacent the adjusting nut, a spring collet in said sleeve bore having a segmented chucking head mating with the tapered mouth of the sleeve, said sleeve having a shoulder adjacent one end of said fingers, a pressure ring in a bore of said housing confronting the fingers to form a rocking fulcrum therefor, a cam ring slidably mounted in a bore of the housing adjacent the retainer nut and having a shoulder extending radially into confronting relation with the segments, said fingers extending into said cam ring, prongs on said cam ring projecting through the retainer nut, a work locator adjustably carried by said retainer nut, means for sliding the segments against the shoulder of the cam ring to tilt the fingers about their fulcrums for forcing the sleeve in a direction opposite to the direction of movement of the segments thereupon causing the tapered mouth of the sleeve to contract the segmented chucking head of the collet, and means for acting on the prongs of the cam ring projecting through the retainer nut to permit the fingers to rock about their fulcrums away from the shoulder of the sleeve, whereby the segmented chucking head of the collet can expand.

2. A combined spindle and collet assembly comprising a cylindrical housing having an external bearing surface for rotatably mounting the housing, a plurality of stepped bores extending inwardly from opposite end faces of the housing and defining bearing walls in concentric relation to the bearing surface around the housing, an adjusting nut threaded into one end of the housing and piloted on a bore wall adjacent one end, a retainer nut threaded into the other end of the housing, a collet sleeve slidably mounted on a bearing wall in the housing between said nuts, peripheral slots extending longitudinally through said sleeve, arcuate segments slidably mounted in alternate slots of said sleeve and extending through the adjusting nut, sleeve actuating fingers rockably mounted in slots of said sleeve between the segment carrying slots, a cam ring slidably mounted in said housing on a bearing wall between the sleeve and the retainer nut and having prongs slidably extending through the retainer nut, said sleeve having a head piloted in the adjusting nut of a tapered mouth in said head, a cylindrical spring collet having a segmented tapered head in said tapered mouth, said cam ring being movable by said segments toward the retainer to tilt the fingers for rocking against the sleeve to force the sleeve toward the adjusting nut and cause the tapered mouth thereof to contract the segmented collet head about an inserted workpiece, and said fingers when released by movement of said cam away from the retaining nut being sensitive to centrifugal force for tilting to permit retraction of the sleeve and opening of the collet.

3. A spindle and collet assembly comprising a cylindrical housing having concentric internal and external bearing walls, a collet sleeve slidably mounted on one of the internal bearing walls, a spring collet in said sleeve having a segmented tapered head arranged to be contracted by movement of the sleeve thereover in one direction and to expand when the sleeve is moved in the opposite direction, a cam ring slidably mounted on one of said walls in said housing, sleeve actuating fingers rockably mounted in said housing and extending into said cam ring to be tilted thereby for sliding the sleeve to cause the collet to contract, means accessible from one end of said housing for sliding the cam ring in a direction to tilt the fingers for sliding the sleeve in one direction to close the collet, means accessible from the other end of said housing for sliding the cam ring in the opposite direction to release the fingers for permitting the sleeve to slide to allow the collet to open, an adjusting nut threaded into one end of the housing for determining the position of the collet in the sleeve to control the working pressure of the collet, means for locking the adjusting nut in a selected position, a retaining nut threaded into the other end of the housing for retaining the cam ring in the housing, a work locator adjustably carried in said retainer nut, and means for locking the work locator in a selected position in the retaining nut, whereby a workpiece bottomed in the locator will project through the collet beyond the spindle just sufficiently to expose the workpiece for a machining or grinding operation.

4. A collet and spindle assembly which comprises a rotating spindle having concentric inner and outer bearing walls, said outer bearing wall adapted for rotatably mounting the spindle, a collet sleeve slidably mounted on one of the bearing walls in the spindle, a spring collet nested in said sleeve and coating therewith to be contracted upon movement of the sleeve in one direction, cam fingers extending longitudinally through said sleeve and acting on the sleeve for movement of the sleeve in said one direction, a cam ring slidably mounted on another of said walls in said spindle for acting on said fingers to rock the fingers for sliding the sleeve to contract the collet, a work locator adjustably mounted in one end face of the spindle, an adjusting nut mounted in the other end face of the spindle for selectively positioning the collet sleeve, said nut having slots therethrough, and means acting through said slots for sliding the cam ring to cause the ring to tilt the fingers and force the sleeve over the collet for closing the collet.

5. A collet assembly comprising a housing, a cam ring slidably mounted in said housing, a collet sleeve slidably mounted in said housing adjacent said cam ring, a spring collet in said sleeve, said collet and sleeve having coacting tapered surfaces whereby the collet will be contracted upon sliding of the sleeve in one direction over the collet, rockably mounted fingers in said housing acting against said sleeve to force the sleeve in said one direction, said fingers extending into said cam ring to be actuated thereby, an adjusting nut threaded into one end of the housing into abutting relation with the collet for determining the operating pressure of the collet on an inserted workpiece, means accessible through said adjusting nut for shifting the cam ring to tilt the fingers for sliding the sleeve over the collet to close the collet, a work locator mounted in the other end of the housing in spaced opposed relation to the collet and having a surface to bottom a work piece seated in the collet, means accessible through said work locator for sliding the cam ring off of the fingers to release the collet, means for locking the adjusting nut in selected position, and means for adjusting the work locator relative to the collet.

6. A spindle and collet assembly comprising a spindle having external bearing surfaces for rotatably mounting the spindle about a fixed central axis, a collet sleeve slidably mounted in the spindle, a spring collet in said sleeve, an adjusting nut threaded in one end of the spindle for acting against said collet to adjust the collet relative to the sleeve for determining the working pressure of the collet on a workpiece, tiltable fingers in said spindle acting on said sleeve for forcing the sleeve over the collet to contract the collet, a cam ring for rocking said fingers, and means accessible from opposite ends of said spindle for shifting said cam ring to open and close the collet.

7. A spindle and collet assembly comprising a spindle housing, a work locator carried for axial adjustment in one end of said housing, an adjusting nut in the other end of said housing, a sleeve slidably mounted in said housing between said locator and adjusting nut, a spring collet in said sleeve bottomed on said adjusting nut, fingers extending through said sleeve acting thereagainst for forcing the sleeve over the collet to close the collet, a cam ring surrounding the ends of the fingers remote from the collet and having internal cam surfaces for rocking the fingers, means accessible through said adjusting nut for shifting the cam ring to rock the fingers for closing the collet, and means accessible through said work locator for shifting the cam ring in the opposite direction to permit the collet to open.

8. A collet and spindle assembly comprising a hollow spindle, a spring collet in said spindle, a collet closing sleeve slidably mounted in said spindle and surrounding said spring collet, a work locator adjustably mounted in one end of said spindle remote from said collet, an adjusting nut mounted in the other end of said spindle for determining the working pressure of the collet, fingers rockably mounted in said spindle for sliding the sleeve over the collet to close the collet, a cam ring slidably mounted in said spindle for actuating said fingers, means accessible through said work locator for shifting the cam ring in one direction, means accessible through said adjusting nut for shifting the cam in the other direction, and a locking member for holding the adjusting nut in fixed position.

9. A collet assembly comprising a hollow spindle, a work hollow locator in one end of said spindle receiving the work therein to longitudinally and radially position the work, a collet in the other end of said spindle, means for adjusting the work locator relative to the collet to control the extent of projection of a workpiece beyond the spindle, and an adjusting nut independent of said work locator in the opposite end of the spindle for determining the working pressure of the collet regardless of the position of the work locator.

10. A spindle and collet assembly comprising a hollow spindle, a collet sleeve slidably mounted in said spindle, a spring collet in said sleeve, a cam ring slidable in said spindle, an adjusting nut threaded into one end of said spindle adjacent said collet, cam actuating segments slidable through said nut and sleeve, a pressure ring in said spindle, fingers rockably mounted on said pressure ring and arranged to slide the sleeve over the collet to close the collet, and means for rotating said nut to adjustably position the sleeve fingers relative to the cam and pressure rings for determining the working pressure of the collet.

11. A combined spindle and collet comprising a hollow spindle, a work receiving locator carried for axial adjustment in one end of the spindle to radially and axially position the work, a chuck in the other end of the spindle, means in the spindle for closing the chuck, and an adjusting nut independent of said work locator in the spindle coacting with said chuck closing means to regulate the working pressure of the chuck on a workpiece regardless of the position of the work locator.

12. A spindle and collet assembly comprising an annular spindle housing having a bore and a fulcruming surface therein, a collet contracting sleeve slidably fitted in and centered by said housing bore, said sleeve having an axially extending slot, a contractible collet carried in said sleeve for contraction thereby, a tiltable finger projecting into said axially extending slot for engagement with said sleeve and with said fulcruming surface, a cam ring slidably fitted in said housing bore and engaging said finger axially of said sleeve, and means for sliding said cam ring in said housing bore to tilt said finger about said fulcruming surface into pressing engagement with said collet contracting sleeve.

13. A spindle and collet assembly comprising an annular spindle housing having a bore and a fulcruming surface therein, a collet contracting sleeve slidably fitted in and centered by said housing bore, said sleeve having a plurality of axially extending slots, a contractible collet carried in said sleeve for contraction thereby, a tiltable finger projecting into one of said axially extending slots for engagement with said sleeve and with said fulcruming surface, a cam ring slidably fitted in said housing bore and engaging said finger axially of said sleeve, and means including a member slidable in another one of said axially extending slots of said sleeve for engaging and sliding said cam ring in said housing bore to tilt said finger about said fulcruming surface into pressing engagement with said collet contracting sleeve.

References Cited in the file of this patent

UNITED STATES PATENTS

| | | |
|---|---|---|
| 412,027 | Hartness et al. | Oct. 1, 1889 |
| 442,230 | Libby | Dec. 9, 1890 |
| 1,747,657 | Avilla | Feb. 18, 1930 |
| 1,818,305 | Class | Aug. 11, 1931 |
| 2,262,849 | Knecht | Nov. 18, 1941 |
| 2,421,474 | Alter | June 3, 1947 |
| 2,471,921 | Ashdown | May 31, 1949 |
| 2,494,764 | Jursinovic | Jan. 17, 1950 |
| 2,528,146 | Hubert | Oct. 31, 1950 |
| 2,569,093 | Drissner | Sept. 25, 1951 |
| 2,585,747 | Denzler | Feb. 12, 1952 |